(12) United States Patent
Barile (10) Patent No.: US 8,613,040 B2
(45) Date of Patent: Dec. 17, 2013

(54) ADAPTIVE DATA LOSS PREVENTION POLICIES

(75) Inventor: Ian Barile, Mountain View, CA (US)

(73) Assignee: Symantec Corporation, Mountain View, CA (US)

(*) Notice: Subject to any disclaimer, the term of this patent is extended or adjusted under 35 U.S.C. 154(b) by 815 days.

(21) Appl. No.: 12/342,038

(22) Filed: Dec. 22, 2008

(65) Prior Publication Data
US 2010/0162347 A1    Jun. 24, 2010

(51) Int. Cl.
G06F 17/00    (2006.01)

(52) U.S. Cl.
USPC ............................ 726/1; 709/223; 709/230

(58) Field of Classification Search
USPC .............................................. 726/1; 709/230
See application file for complete search history.

(56) References Cited

U.S. PATENT DOCUMENTS

| | | | |
|---|---|---|---|
| 4,858,152 A | 8/1989 | Estes | |
| 5,212,821 A | 5/1993 | Gorin et al. | |
| 5,379,391 A | 1/1995 | Belsan et al. | |
| 5,384,892 A | 1/1995 | Strong | |
| 5,577,249 A | 11/1996 | Califano | |
| 5,739,391 A | 4/1998 | Ruppel et al. | |
| 5,796,948 A | 8/1998 | Cohen | |
| 5,832,212 A | 11/1998 | Cragun et al. | |
| 5,835,722 A | 11/1998 | Bradshaw et al. | |
| 5,883,588 A | 3/1999 | Okamura | |
| 5,884,033 A | 3/1999 | Duvall et al. | |
| 5,892,905 A | 4/1999 | Brandt et al. | |
| 5,958,015 A | 9/1999 | Dascalu | |
| 5,960,080 A | 9/1999 | Fahlman et al. | |
| 5,996,011 A | 11/1999 | Humes | |
| 6,047,283 A | 4/2000 | Braun | |
| 6,055,538 A | 4/2000 | Kessenich et al. | |
| 6,065,056 A | 5/2000 | Bradshaw et al. | |
| 6,073,142 A | 6/2000 | Geiger et al. | |
| 6,125,371 A * | 9/2000 | Bohannon et al. | 707/695 |
| 6,233,618 B1 | 5/2001 | Shannon | |
| 6,314,190 B1 | 11/2001 | Zimmermann | |
| 6,321,224 B1 | 11/2001 | Beall et al. | |
| 6,360,215 B1 | 3/2002 | Judd et al. | |
| 6,374,241 B1 | 4/2002 | Lamburt et al. | |
| 6,396,513 B1 | 5/2002 | Helfman et al. | |
| 6,442,607 B1 | 8/2002 | Korn et al. | |

(Continued)

FOREIGN PATENT DOCUMENTS

| | | |
|---|---|---|
| CA | 2 499 508 | 4/2004 |
| CA | 2 597 083 | 8/2006 |

(Continued)

OTHER PUBLICATIONS

Alonso, Omar, et al, Oracle Secure Enterprise Search 10g, An Oracle Technical White Paper, Mar. 2006, 21 pages.

(Continued)

*Primary Examiner* — April Y Blair
(74) *Attorney, Agent, or Firm* — Lowenstein Sandler LLP (57) ABSTRACT

A monitor detects a policy violation on a computing device, wherein the policy violation includes a user attempt to perform an operation to move data that includes sensitive information off the computing device. The monitor determines whether one or more previous policy violations have occurred on the computing device. The monitor performs an action to minimize a risk of data loss based on the one or more previous policy violations.

21 Claims, 5 Drawing Sheets

(56) References Cited

U.S. PATENT DOCUMENTS

| | | | |
|---|---|---|---|
| 6,453,338 B1 | 9/2002 | Shiono | |
| 6,604,141 B1 | 8/2003 | Ventura | |
| 6,618,725 B1 | 9/2003 | Fukuda et al. | |
| 6,636,838 B1 | 10/2003 | Perlman et al. | |
| 6,639,615 B1 | 10/2003 | Majumdar | |
| 6,714,936 B1 | 3/2004 | Nevin, III | |
| 6,732,087 B1 | 5/2004 | Hughes et al. | |
| 6,768,986 B2 | 7/2004 | Cras et al. | |
| 6,769,032 B1 | 7/2004 | Katiyar et al. | |
| 6,778,979 B2 | 8/2004 | Grefenstette et al. | |
| 6,779,120 B1 | 8/2004 | Valente et al. | |
| 6,829,613 B1 | 12/2004 | Liddy | |
| 6,829,635 B1 | 12/2004 | Townshend | |
| 6,871,284 B2 | 3/2005 | Cooper et al. | |
| 6,941,466 B2 | 9/2005 | Mastrianni et al. | |
| 6,965,886 B2 | 11/2005 | Govrin et al. | |
| 6,983,186 B2 | 1/2006 | Navani et al. | |
| 7,000,154 B1 * | 2/2006 | LeDuc et al. | 714/47.2 |
| 7,114,185 B2 | 9/2006 | Moore et al. | |
| 7,130,885 B2 | 10/2006 | Chandra et al. | |
| 7,146,402 B2 | 12/2006 | Kucherawy | |
| 7,162,738 B2 | 1/2007 | Dickinson, III et al. | |
| 7,191,252 B2 | 3/2007 | Redlich et al. | |
| 7,222,158 B2 | 5/2007 | Wexelblat | |
| 7,237,008 B1 | 6/2007 | Tarbotton et al. | |
| 7,237,267 B2 * | 6/2007 | Rayes et al. | 726/25 |
| 7,249,175 B1 | 7/2007 | Donaldson | |
| 7,320,004 B1 | 1/2008 | DeLuca et al. | |
| 7,464,402 B2 * | 12/2008 | Briscoe et al. | 726/5 |
| 7,882,560 B2 * | 2/2011 | Kraemer et al. | 726/22 |
| 2001/0037324 A1 | 11/2001 | Agrawal et al. | |
| 2002/0010679 A1 | 1/2002 | Felsher | |
| 2002/0073313 A1 | 6/2002 | Brown et al. | |
| 2002/0093676 A1 | 7/2002 | Parry | |
| 2002/0129140 A1 | 9/2002 | Peled et al. | |
| 2002/0138579 A1 | 9/2002 | Goldberg | |
| 2002/0178228 A1 | 11/2002 | Goldberg | |
| 2002/0198766 A1 | 12/2002 | Magrino et al. | |
| 2002/0199095 A1 | 12/2002 | Bandini et al. | |
| 2003/0051026 A1 | 3/2003 | Carter et al. | |
| 2003/0093518 A1 | 5/2003 | Hiraga | |
| 2004/0039991 A1 | 2/2004 | Hopkins et al. | |
| 2004/0187024 A1 * | 9/2004 | Briscoe et al. | 713/201 |
| 2004/0225645 A1 | 11/2004 | Rowney et al. | |
| 2005/0027723 A1 | 2/2005 | Jones et al. | |
| 2005/0060537 A1 | 3/2005 | Stamos et al. | |
| 2005/0086252 A1 | 4/2005 | Jones et al. | |
| 2005/0138110 A1 | 6/2005 | Redlich et al. | |
| 2005/0182765 A1 | 8/2005 | Liddy | |
| 2005/0216771 A1 | 9/2005 | Malcolm | |
| 2006/0005247 A1 | 1/2006 | Zhang et al. | |
| 2006/0184549 A1 | 8/2006 | Rowney et al. | |
| 2006/0224426 A1 * | 10/2006 | Goossens et al. | 705/8 |
| 2006/0224589 A1 | 10/2006 | Rowney et al. | |
| 2007/0130255 A1 | 6/2007 | Wolovitz et al. | |
| 2007/0233842 A1 * | 10/2007 | Roberts et al. | 709/223 |
| 2008/0066150 A1 | 3/2008 | Lim | |
| 2009/0037594 A1 * | 2/2009 | Sever et al. | 709/230 |
| 2009/0119743 A1 * | 5/2009 | Werner et al. | 726/1 |

FOREIGN PATENT DOCUMENTS

| | | |
|---|---|---|
| GB | 2 343 030 A | 4/2000 |
| JP | 2005-539334 | 12/2005 |
| JP | 2008171101 A | 1/2007 |
| JP | 2008-537195 | 9/2008 |
| WO | WO2004/027653 | 4/2004 |
| WO | WO2006/088952 | 8/2006 |

OTHER PUBLICATIONS

Attenex, Attenex Patterns Suite, http://www.attenex.com/products_services/attenex_patterns_suite.aspx, Downloaded Feb. 20, 2008, 2 pages.

Autonomy, Autonomy Group product overview, http://www.autonomy.com/content/products/index.en.html, Downloaded Feb. 20, 2008, 2 pages.

Autonomy, Security, http://www.autonomy.com/content/Technology/Technology_Benefits/security, Feb. 20, 2008, 2 pages.

Autonomy, Technology overview, http://www.autonomy.com/content/Technmology/index.en.html, Downloaded Feb. 20, 2008, 2 pages.

Autonomy, Limitations of Other Approaches, http://www.autonomy.com/content/Technology/Limitations_Other_Approaches, Downloaded Feb. 20, 2008, 2 pages.

Buchta, Stefan, Oracle Secure Enterprise Search Version 10.1.8.2, An Oracle Technical White Paper, Oct. 2007, 30 pages.

Cisco, A Report From Ironport Systems, "Data Loss Prevention Best Practices—Managing Sensitive Data in the Enterprise", 2007, 21 pages.

Clearwell Systems, The Clearwell E-Discovery Platform®, http://www.clearwellsystems.com/products/e-discovery-platform, Downloaded Feb. 20, 2008 2 pages.

Clearwell Systems, The Clearwell E-Discovery Platform: Analysis, http://www.clearwellsystems.com/products/e-discovery-analysis.php, Downloaded Feb. 20, 2008, 1 page.

Clearwell Systems, The Clearwell E-Discovery Platform: Case Management, http://www.clearwellsystems.com/products/e-discovery-case-management, Downloaded Feb. 20, 2008 2 pages.

Clearwell Systems The Clearwell E-Discovery Platform: Processing, http://www.clearwellsystems.com/products/e-discovery-processing.php, Downloaded Feb. 20, 2008, 2 pages.

Clearwell Systems The Clearwell E-Discovery Platform: Review, http://www.clearwellsystems.com/products/e-discovery-review.php, Downloaded Feb. 20, 2008 2 pages.

Clearwell Systems the Clearwell E-Discovery Platform: Search &Cull-Down, http://www.clearwellsystems.com/products/e-discovery-search-cull.php, Downloaded Feb. 20, 2008 1 page.

Dale, et al., "Programming and Problem Solving with C++," 2002, Jones and Bartlett Publishers, 3rd Edition, pp. 653-662.

Deitel, et al., "C++—How to Program," 2001, Prentice Hall, 3rd Edition, pp. 273-279 fast, Fast ESP Revitalizing your search experience with intelligent, user-centric search, 2007, Fast Search & Transfer ASA. , 6 pages.

Google, Google Search Appliance, http://www.google.com/enterprise/gsa/, Downloaded, Feb. 20, 2008, 2 pages.

Guidance Software, EnCase® eDiscovery Suite, http://www.guidancesoftware.com/products/ediscovery_index.aspx, Downloaded Feb. 20, 2008, 2 pages.

Kaufman, et al., "Network Security-Private Communication in a Public World," 1995, Prentice, Hall PTR, p. 80.

Koch, et al., "Oracle8—The Complete Reference," 1997, Osborn McGraw-Hill, pp. 9-7 and 51-62.

Krishnaprasad, Muralidhar, et al, Oracle Searching Enterprise Applications (Siebel 7.8 and E-Business Suite 11i) with Oracle Secure Enterprise Search 10.1.8, An Oracle White Paper, Jan. 2007, 25 pages.

Oracle Secure Enterprise Search 10G, Mar. 2006, 8 pages.

Oracle8™ Tuning, Release 8.0, Dec. 1997, Oracle®.

PCT Search Report PCT /US03/30178 dated Mar. 11, 2004, 5 pages.

PCT Search Report PCT /US06/5317 dated 07/24/06, 5 pages.

Websense Data Security Solutions, website brochure, 6 pp., Websense Inc., United States, Oct. 15, 2008, available at http://www.websense.com/docs/brochures/WBSN_DataSecurity_Web.pdf.

Zantaz, Enterprise Archive Solution (EAS) Product family, Datasheet, 4 pages.

Office Action for U.S. Appl. No. 10/247,002 mailed Mar. 3, 2006.
Office Action for U.S. Appl. No. 10/247,002 mailed Aug. 21, 2006.
Office Action for U.S. Appl. No. 10/247,002 mailed Jan. 23, 2007.
Office Action for U.S. Appl. No. 10/247,002 mailed Sep. 17, 2007.
Office Action for U.S. Appl. No. 10/247,002 mailed Dec. 12, 2007.
Office Action for U.S. Appl. No. 10/247,002 mailed Jun. 18, 2008.
Office Action for U.S. Appl. No. 10/247,002 mailed Nov. 25, 2008.
Office Action for U.S. Appl. No. 10/431,145 mailed Oct. 23, 2006.
Office Action for U.S. Appl. No. 10/431,145 mailed Jul. 26, 2007.
Office Action for U.S. Appl. No. 10/431,145 mailed Feb. 25, 2008.

(56) References Cited

OTHER PUBLICATIONS

Notice of Allowance for U.S. Appl. No. 10/431,145 mailed Aug. 20, 2008.
Office Action for U.S. Appl. No. 10/607,718 mailed Feb. 10, 2006.
Office Action for U.S. Appl. No. 10/607,718 mailed Jun. 28, 2006.
Office Action for U.S. Appl. No. 10/607,718 mailed Nov. 15, 2006.
Office Action for U.S. Appl. No. 10/607,718 mailed Jul. 10, 2007.
Office Action for U.S. Appl. No. 10/607,718 mailed Jan. 8, 2008.
Office Action for U.S. Appl. No. 10/607,718 mailed Jul. 3, 2008.
Office Action for U.S. Appl. No. 10/833,538 mailed Oct. 31, 2006.
Office Action for U.S. Appl. No. 10/833,538 mailed Jul. 23, 2007.
Office Action for U.S. Appl. No. 10/833,538 mailed Feb. 14, 2008.
Notice of for U.S. Appl. No. 10/833,538 mailed Aug. 6, 2008.
Office Action for U.S. Appl. No. 10/892,982 mailed Jan. 23, 2007.
Office Action for U.S. Appl. No. 10/892,982 mailed Sep. 17, 2007.
Office Action for U.S. Appl. No. 10/892,982 mailed Apr. 8, 2008.
Office Action for U.S. Appl. No. 10/892,982 mailed Oct. 27, 2008.
Office Action for U.S. Appl. No. 10/892,615 mailed Apr. 27, 2007.
Office Action for U.S. Appl. No. 10/892,615 mailed Dec. 12, 2007.
Office Action for U.S. Appl. No. 10/892,615 mailed Apr. 21, 2008.
Office Action for U.S. Appl. No. 10/892,615 mailed Dec. 5, 2008.
Office Action for U.S. Appl. No. 11/057,988 mailed Aug. 18, 2008.
Office Action for U.S. Appl. No. 11/058,551 mailed Sep. 9, 2008.
GB Search Report GB0921722.5, Mar. 26, 2010, 1 pages.
A Report From Iron Port Systems (CISCO), "Data Loss Prevention Best Practices—Managing Sensitive Data in the Enterprise", 2007, 21 pages.

* cited by examiner

| DLP Policy | Previous Violations | Action |
|---|---|---|
| 1 | 1<br>2 then 3<br>3 then 2 | A<br>B<br>C |
| 2 | N/A<br>1 | D<br>E |
| 3 | 1 and 1<br>1 and 2 | F<br>G |
| 4 | 1 and/or 3 | H |
| 5 | Any of 1-5 | I |

ADAPTIVE DATA LOSS PREVENTION POLICIES

FIELD OF INVENTION

Embodiments of the present invention relate to the field of data loss prevention, and more particularly, to adjusting data loss prevention policies based on user behavior.

BACKGROUND OF THE INVENTION

Employees of a modern organization often have access to files including information concerning various significant business aspects of the organization. This information may include data on customers (or patients), contracts, deliveries, supplies, employees, manufacturing, or the like. Conventional security techniques typically scan data as it is leaving an endpoint system, and perform predetermined actions based on static data loss prevention (DLP) policies to prevent loss of sensitive information. In conventional security techniques, given a particular user, article of information and attempted user operation, the same predetermined actions will always be performed. This requires an administrator to decide, at the time that the security system is set up, whether to have highly restrictive DLP policies or less restrictive DLP policies. Highly restrictive policies make data safer at the cost of consuming large amounts of system resources and possibly preventing users from performing legitimate operations (causing false positives). Less restrictive policies use fewer resources and cause fewer false positives, but provide a less secure environment. Conventional security techniques are not able to dynamically change actions and DLP policies (e.g., to increase or decrease protection) based on user behavior.

SUMMARY OF THE INVENTION

In a data loss prevention system, a monitoring application detects a policy violation on a computing device. The policy violation may be detected by detecting a user attempt to perform an operation to move data off of the computing device, scanning the data to determine that the data includes sensitive information, and determining that the user is not authorized to perform the operation. In response to a policy violation being detected, monitoring application determines whether one or more previous policy violations have occurred on the computing device and/or by the user. The monitoring application performs an action to minimize a risk of data loss based on the one or more previous policy violations.

BRIEF DESCRIPTION OF THE DRAWINGS

The present invention will be understood more fully from the detailed description given below and from the accompanying drawings of various embodiments of the invention.

DETAILED DESCRIPTION OF THE PRESENT INVENTION

A system and method for preventing data loss using adaptive data loss prevention policies and/or adaptive data loss prevention response rules is described herein. In the following description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "detecting", "calculating", "determining", "performing" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Figure 1A:
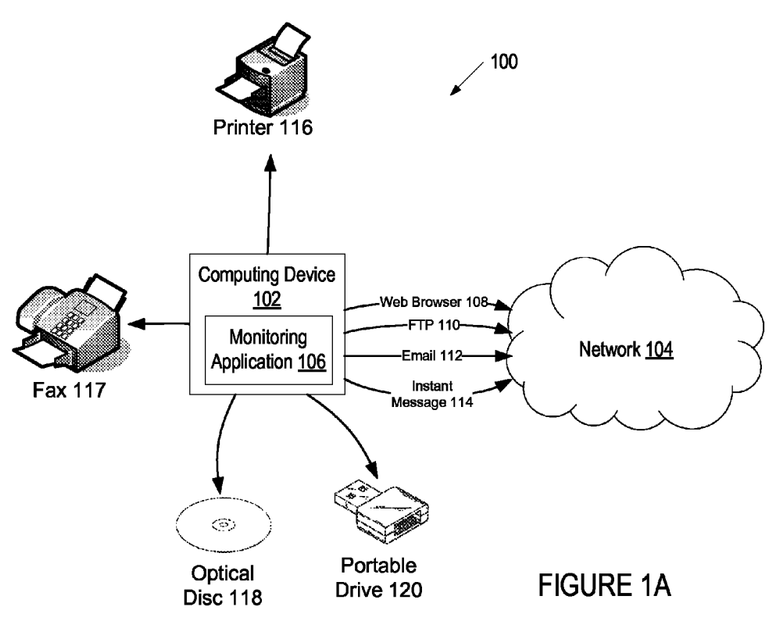
FIG. 1A illustrates an exemplary system architecture showing multiple possible data loss vectors through which data can exit a computing device, in accordance with one embodiment of the present invention.

FIG. 1A illustrates an exemplary system architecture 100 showing multiple possible data loss vectors through which data can exit a computing device 102, in accordance with one embodiment of the present invention. The computing device 102 may be a personal computer (PC), a laptop, a mobile phone, a server, or any other computing device. Computing device 102 has multiple different data loss vectors. Each data loss vector is a path through which data can be transferred off of computing device. Examples of data loss vectors include burning files to an optical disc 118, copying data to a portable drive 120 (e.g., a portable universal serial bus (USB) drive such as a thumb drive or a portable IEEE 1394 (Firewire) hard drive), printing data to a printer 116, sending data through a fax 117, etc. Many data loss vectors place data on and/or move data through a public network 104. Examples of data loss vectors that may move data through a public network 104 include a web browser 108, file transfer protocol (FTP) 110, email 112, instant messages 114, etc. Computing device 102 may also include additional data loss vectors that are not mentioned herein.

Computing device 102 includes a monitoring application 106 that monitors data loss vectors to ensure that sensitive (e.g., confidential) information does not leave the computing device 102 for illegitimate purposes. In one embodiment, monitoring application 106 scans data as it moves through a data loss vector. If the monitoring application 106 determines that the data includes sensitive information, then the monitoring application 106 may perform one or more actions to safeguard the sensitive information. Examples of actions include sending a notification to an administrator, preventing the data from exiting the computing device 102 through the data loss vector, locking down the computer so that no data can be moved off of the computing device 102 through any data loss vector, encrypting data as it is moved off the computing device 102, and so on. In one embodiment, monitoring application 106 dynamically determines what action or actions to take based on adaptive DLP policies. The adaptive DLP policies may trigger different response rules based on behavior of the computing device's user. Adaptive DLP policies are discussed in greater detail below with reference to FIG. 1B.

Figure 1B:
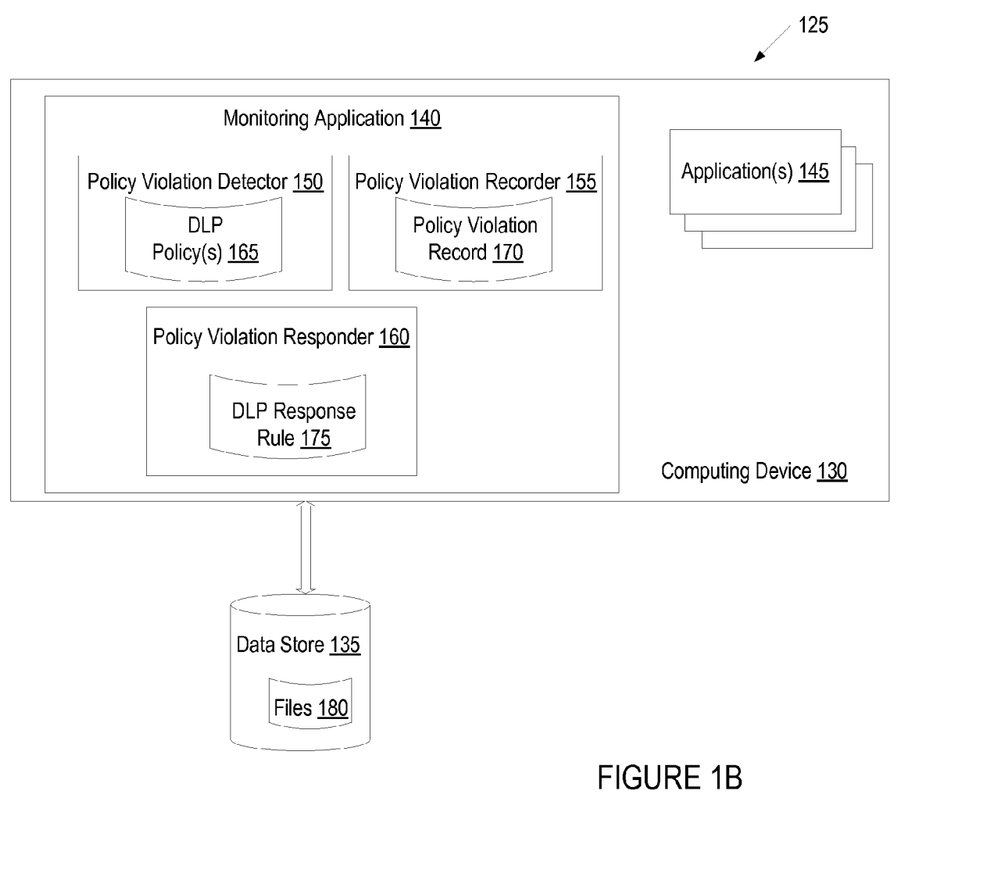
FIG. 1B is a block diagram of an exemplary system architecture, in which embodiments of the invention may operate.

FIG. 1B is a block diagram of exemplary system architecture 125, in which embodiments of the invention may operate. In one embodiment, system architecture 125 corresponds to system architecture 100 of FIG. 1A. The system architecture 125 includes a computing device 130 and a data store 135. The computing device 130 runs an operating system (OS) that manages hardware and software of the computing device 130. The OS may be, for example, Microsoft® Windows® OS, Linux, Mac OS, Solaris, etc. One or more applications 145 run on top of the OS and perform various operations that involve accessing, moving, or otherwise manipulating data 180 residing in the data store 135. For example, the applications 145 may include a CD or DVD burning application, an email application, a web browser, an instant messaging application, a printing application, etc. In one embodiment, the applications 145 perform the operations in response to receiving user instructions.

Data store 135 may be a hard disk drive, tape backup, optical drive, volatile memory (e.g., random access memory (RAM)), or other storage device. Data store 135 may be internal to computing device 130 or external to computing device 130. In one embodiment, data store 135 is network storage such as a storage area network (SAN) or network attached storage (NAS). In another embodiment, data store 135 is a database such as a relational database. Data store 135 may contain data 180 that includes sensitive information. The data 180 may include files, tables, or other data formats. Examples of sensitive information include social security numbers, credit card numbers, bank account numbers, phone numbers, addresses, and so on.

In one embodiment, the computing device 130 hosts a monitoring application 140 that monitors applications 145 and/or data 180, and performs actions when predefined criteria are observed. Monitoring application 140 may also monitor some or all data loss vectors of computing device 130, and may monitor user behavior (e.g., operations initiated by a user on the computing device 130). In one embodiment, monitoring application 140 includes a policy violation detector 150, a policy violation recorder 155 and a policy violation responder 160.

Policy violation detector 150 may monitor data loss vectors, applications 145, data 180, etc. to detect operations that attempt to move (e.g., copy or transfer) data off of computing device 130. In one embodiment, policy violation detector 150 monitors actions taken by a user of the computing device 130 to detect user requested operations that may involve a potential misuse of data. The user initiated operations may include, for example saving or accessing restricted database data on any storage device of the computing device 130, using restricted database data in an application, printing confidential data, using confidential data in a network communication protocol, etc. In one embodiment, policy violation detector 150 parses and searches the content that is either accessed or saved onto any storage system available to computing device 130, or transported using various application layer protocols (e.g., simple mail transfer protocol (SMTP), hypertext transfer protocol (HTTP), FPT, AOL instant messenger (AIM), ICQ, simple object access protocol (SOAP), etc.). In another embodiment, policy violation detector 150 monitors user actions by intercepting and interpreting data exchanged between the user and the computing device 130. Policy violation detector 150 may also include a filter driver (not shown) that acts as part of the OS to be able to determine which applications 145 start executing (e.g., by intercepting OS calls for process creation) and to see I/O requests of executing applications 145 (e.g., using file system hooks to see all file I/O on the system and to receive I/O request packets (IRPs)).

Upon detecting an operation that will move data off of computing device 130, policy violation detector 110 analyzes the operation to determine whether it violates a data loss prevention (DLP) policy. Examples of operations include transferring data 180 via FTP or other transfer protocol, printing data, burning a file to an optical disk, etc. In one embodiment, operations are associated with one or more data loss vectors.

DLP policies 165 include criteria that may indicate an increased risk of data loss. A DLP policy 165 is violated if one or more criteria included in the DLP policy 165 are satisfied. Examples of criteria include user status (e.g., whether the user has access privileges to a file), file location (e.g., whether a file to be copied is stored in a confidential database), file contents (e.g., whether a file includes sensitive information), time (e.g., whether a requested operation is requested during normal business hours), data loss vector, application attempting the operation, and so on. If the policy violation detector 150 determines that a requested operation to move data off of the computing device 130 through a data loss vector does not satisfy the criteria of any DLP policy 135 (e.g., if data being printed does not contain sensitive information), then no policy violation is detected and no action may be performed. If the policy violation detector 150 determines that the requested operation does satisfy the criteria of an active/enabled DLP policy (e.g., if an unauthorized user attempts to burn data including confidential information to a CD), then a policy violation is detected and the policy detector 150 notifies the policy violation responder 160 and/or the policy violation recorder 155 of the policy violation. An example DLP policy 165 may be violated, for example, if a user attempts to copy data including confidential information from a particular database to a portable drive attached to computing device 130. Another example DLP policy 165 may be violated, for example, if a user attempts to burn any data including credit card numbers onto an optical disc.

Policy violation recorder 155 maintains a policy violation record 170 of some or all policy violations that have occurred on computing device 130 and/or that have been attempted by a particular user. The user may be identified, for example, based on a user login. In addition to identifying the DLP policy that was violated, each entry in the policy violation record 170 may also indicate the circumstances of the policy violation. For example, the policy violation record 170 may identify an application 145, user, data loss vector, type of sensitive data (e.g., social security number, credit card number, etc.), etc. associated with the policy violation. The policy violation record 170 may also include a time stamp showing when the policy violation occurred.

In one embodiment, the policy violation record 170 can be used as a data loss threat indicator. As more policy violations are recorded and/or more egregious policy violations are detected, a threat that data may be lost based on actions of a particular user and/or computing device 130 may increase. Threat assessment may be based on, for example, number of policy violations, amount of sensitive data involved in each policy violation, data loss vectors associated with policy violations, etc. Additional DLP policies that are normally inactive may be enabled as the threat level increases and/or policy violation responses may change as the threat level increases.

If no policy violations have occurred for some time, then policy violations that exceed an age threshold (e.g., policy violation entries older than 1 day, 1 week, 1 month, etc.) may be automatically deleted from the policy violation record, thus reducing an indicated threat level. Alternatively, policy violations may not be deleted, and a threat level may not be reduced, without administrator authorization. In one embodiment, policy violations that exceed an age threshold are automatically removed unless the threat level has been escalated to a predetermined threat level (e.g., medium threat, high threat, etc.).

In one embodiment, policy violation recorder 155 maintains a secondary policy violation record (not shown) whose entries are more permanent than those of the primary policy violation record 170. In such an embodiment, threat assessment may be determined based on a combination of the policy violation record 170 and the secondary policy violation record. For example, if a user has a single policy violation in the policy violation record 170 and no additional policy violations in the secondary policy violation record (e.g., just a copy of the same single policy violation is in the secondary policy violation record), then a low security threat may be assessed. However, if the user has the same single policy violation in the policy violation record 170 but multiple additional policy violations in the secondary policy violation record (e.g., policy violations that occurred long enough in the past to be removed from the primary policy violation record 170), then a medium or high threat level may be assessed.

Policy violation responder 160 includes multiple DLP response rules 175. Each DLP response rule 175 is associated with one or more DLP policies 165 and includes one or more actions for policy violation responder 160 to take in response to violation of an associated DLP policy 165. Once a violation of a DLP policy 165 is discovered by policy violation detector 150, policy violation responder 160 determines which DLP response rules are associated with the violated DLP policy 165. Policy violation responder 160 also determines which DLP response rules (if any) correspond to the policy violations included in the policy violation record 170. One or more actions included in the response rule 175 that is associated with the violated DLP policy 165 and that corresponds to entries in the policy violation record 170 can then be performed. Therefore, policy violation responder 160 may determine what action to take to respond to a DLP policy violation based on the current policy violation and the policy violation record 170 (e.g., based on the current policy violation and a current threat level determined from the policy violation record 170).

If the policy violation record 170 is empty of previous policy violations, for example, policy violation responder 160 may take no action in response to the policy violation. Alternatively, policy violation responder 160 may take a minor action such as encrypting the data 180 before letting it leave the computing device 130 through a data loss vector. If the policy violation record 170 includes one or more previous policy violations, policy violation responder 160 may trigger one or more actions that may prevent or restrict an attempted operation. For example, the policy violation responder 160 may cause access of the to the data 180 to be blocked. Policy violation responder 160 may also take additional actions such as sending a report of the policy violation to an administrator. The more previous policy violations that are indicated by the policy violation record 170 (and thus the higher the threat level for data loss), the more severe the action taken by the policy violation responder 160 may be. For example, if multiple user attempts to move confidential information off of the computing device 130 have already been detected, the computing device may be locked down.

Figure 1C:
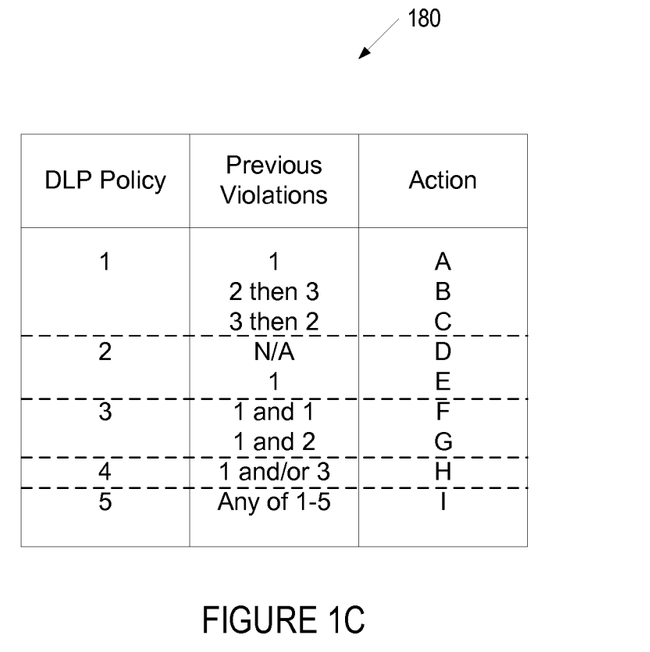
FIG. 1C illustrates a dynamic DLP policy violation response table, in accordance with one embodiment of the present invention

FIG. 1C illustrates an example dynamic DLP policy violation response table 180, in accordance with one embodiment of the present invention. The dynamic DLP policy table 180 includes a first column that includes DLP policies, a second column that includes previous policy violations and a third column that includes response actions. In one embodiment, a combination of a DLP policy, previous policy violations and a response action makes up a response rule. The dynamic DLP policy table 180 shows that different actions may be taken in response to the same DLP policy violation depending on what previous policy violations have occurred.

In the dynamic DLP policy violation response table 180, a first DLP policy (policy 1) is associated with three different potential actions: A, B and C. A first action (action A) is performed if policy 1 is currently violated, and policy 1 has previously been violated at least one other time. Action B is performed if policy 1 is currently violated, and policies 2 and 3 were previously violated, with policy 2 having been violated before policy 3. Action C is performed if policy 1 is currently violated, and policies 2 and 3 were previously violated, with policy 3 having been violated before policy 2. As indicated in response table 180, the order in which previous policy violations have occurred can influence what actions are performed in response to a current policy violation. For example, a different action may be taken if a user previously attempted to email data to a workmate and then copy the data to a USB drive than if the user first attempted to copy the data to a USB drive and then attempted to email the data to a workmate.

In the dynamic DLP policy violation response table 180, a second DLP policy (policy 2) is associated with two different potential actions: D and E. Action D is performed if policy 2 is currently violated, and no previous policy violations have occurred. Action E is performed if policy 2 is currently violated, and policy 1 was previously violated.

A third DLP policy (policy 3) is associated with two different potential actions: F and G. Action F is performed if policy 3 is currently violated, and policy 1 has previously been violated twice. Action G is performed if policy 3 is currently violated, and policy 1 and policy 2 was previously violated. As shown with respect to action G, for some actions the order in which previous policy violations occurred may be immaterial.

The example response table 180 also includes DLP policy 4 and DLP policy 5, each of which are associated with a single action (actions H and I, respectively). Action H is performed if policy 4 is presently violated and one or both of policy 1 and policy 3 were previously violated. Action 1 is performed if policy 5 is presently violated and any of policies 1-5 were previously violated.

The example response table 180 illustrates some possible DLP response rules for purposes of clarifying embodiments of the present invention. However, additional response rules not shown in the example response table 180 are also contemplated.

Figure 2:
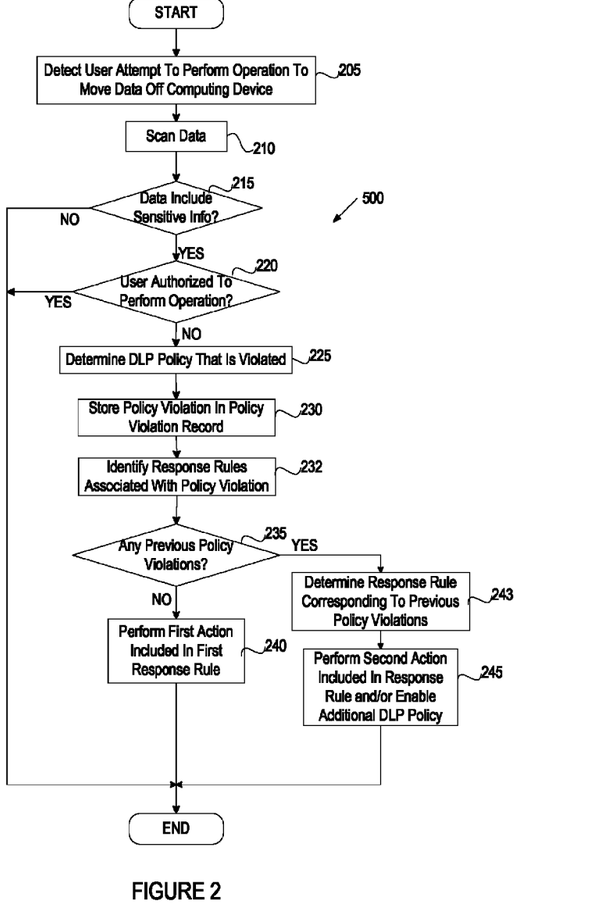
FIG. 2 is a flow diagram illustrating one embodiment for a method of protecting a computing device from data loss.

FIG. 2 is a flow diagram illustrating one embodiment for a method 200 of protecting a computing device from data loss. The method 200 is performed by processing logic that may comprise hardware (circuitry, dedicated logic, etc.), software (such as is run on a general purpose computer system or a dedicated machine), or a combination of both. The method 200 may be performed by a monitoring application such as monitoring application 140 running on computing device 130 of FIG. 1B.

Referring to FIG. 2, at block 205 a monitoring application detects a user attempt to perform an operation to move data off of a computing device. The operation may be an operation to burn the data to an optical disk, to transfer the data to a network location via a transfer protocol such as FTP, to email the data, to copy the data to a portable drive, to print the data, etc.

At block 210, the monitoring application scans the data to determine if the data includes sensitive information. Alternatively, it may be assumed that the data includes sensitive information without scanning the data. For example, if the data was stored in a location that stores sensitive information such as a database of credit card numbers, then it may be assumed that the data includes sensitive information. At block 215, if the data includes sensitive information, the method continues to block 220. If the data does not include sensitive information, the method ends.

At block 220, the monitoring application determines whether the user is authorized to perform the requested operation. For example, a credit card account manager may be authorized to perform certain actions regarding data that contains credit card numbers, while a sales representative may not be authorized to perform those same actions. If the monitoring application determines that the user is not authorized to perform the requested operation, the method continues to block 225. Otherwise, the method ends.

At block 225, the monitoring application determines a DLP policy that has been violated. The DLP policy may be a generic policy that covers unauthorized operations performed on any confidential data. Alternatively, the DLP may be a narrower policy that covers, for example, a specific operation (e.g., emailing of confidential data), specific data sources (e.g., a confidential database), and/or a specific class of user. In one embodiment, multiple policies may be violated by the same user action (e.g., by a single request to perform an operation on confidential data). Alternatively, only a single policy violation may occur based on a single user action. In such an instance, if the criteria included in more than one DLP policy are satisfied, then one DLP policy may take precedence over the others. For example, if there is a generic DLP policy and a more specific DLP policy that both apply to the same user action, then the specific DLP policy may be considered violated, and the generic DLP policy may be ignored.

At block 230, the monitoring application stores the policy violation (or policy violations) in a policy violation record. The monitoring application may also remove previous policy violations from the policy violation record that exceed an age threshold. The policy violation record may be used to determine a threat of data loss posed by the user and/or a computing device.

At block 232, the monitoring application identifies one or more response rules that are associated with the DLP policy that has been violated. A single DLP policy may be associated with multiple different response rules. Each response rule may include different actions to perform in response to the policy violation.

At block 235, the monitoring application examines the policy violation record to determine whether any previous policy violations have occurred for the user and/or the computing device. In one embodiment, only previous policy violations associated with the data on which the operation has been attempted are considered. In another embodiment, previous policy violations associated with the same type of data as the current data on which the operation has been requested are considered. The same type of data may be, for example, data stored in the same repository, data including the same category of sensitive information (e.g., social security numbers), and so on. Alternatively, all previous policy violations may be considered. The monitoring application may make a threat assessment based on the policy violation record. If no previous policy violations have occurred, the method proceeds to block 240. If one or more previous policy violations have occurred, the method proceeds to block 243.

At block 240, the monitoring application performs a first action included in a first response rule of the identified response rules. The first response rule identifies what action or actions to take in response to the policy violation if there is no record of previous policy violations. The first action may be a minor action such as, for example, encrypting the data before permitting it to leave the computing device, or generating a record of the data transfer, but otherwise permitting the data to leave the computing device without modifying the data.

At block 243, the monitoring application determines a response rule of the identified response rules that corresponds to the previous policy violations. For example, if a first previous policy violation is indicated, then one response rule may be determined, while if a second previous policy violation is indicated, or a first and a second previous policy violation is indicated, then another response rule may be determined.

At block 245, the monitoring application performs a second action included in the determined response rule and/or enables an additional DLP policy. The second action may be a restrictive action such as preventing the operation from occurring, locking down the computer to prevent loss of data through any data loss vector, notifying an administrator of the policy violation, etc. In one embodiment, if a threat level is low, not all data loss vectors are monitored and/or not all data is monitored. DLP policies that monitor such data loss vectors and/or data may therefore be inactive if the threat level is low. Once the threat level is escalated, additional DLP policies may be enabled to monitor those data loss vectors and/or data that would not normally be monitored.

One example implementation of method 200 is now demonstrated. A user attempts to email a confidential document to an unauthorized destination. The monitoring application scans the email and detects that the email includes the confidential document. The monitoring application then determines that emailing the confidential document violates a first DLP policy, determines that no previous policy violations have occurred, identifies an appropriate response rule, and blocks the email in accordance with an action included in the response rule. The user then attempts to copy the confidential document to a USB drive. The monitoring application detects a violation of a second DLP policy, determines that the first DLP policy has already been violated, finds an appropriate response rule, and blocks the copy operation based on an action included in the response rule. In response to the second policy violation, the monitoring application also enables an additional DLP policy that monitors print and fax operations. The user attempts to print the confidential data. The newly enabled additional response rule is violated, it is determined that the first and second DLP policies have previously been violated, and an action is performed to block the print attempt. An additional action is also taken to lock the computing device down, preemptively blocking all future attempts to move the confidential data off the computing device.

Based on the above example, if the user had attempted to print the confidential document without first attempting to email the document and copy the document to a USB drive, the print operation would have been permitted. However, because the user had previously performed suspicious actions (emailing and copying the confidential document), a threat level was increased, and the print operation was blocked.

Figure 3:
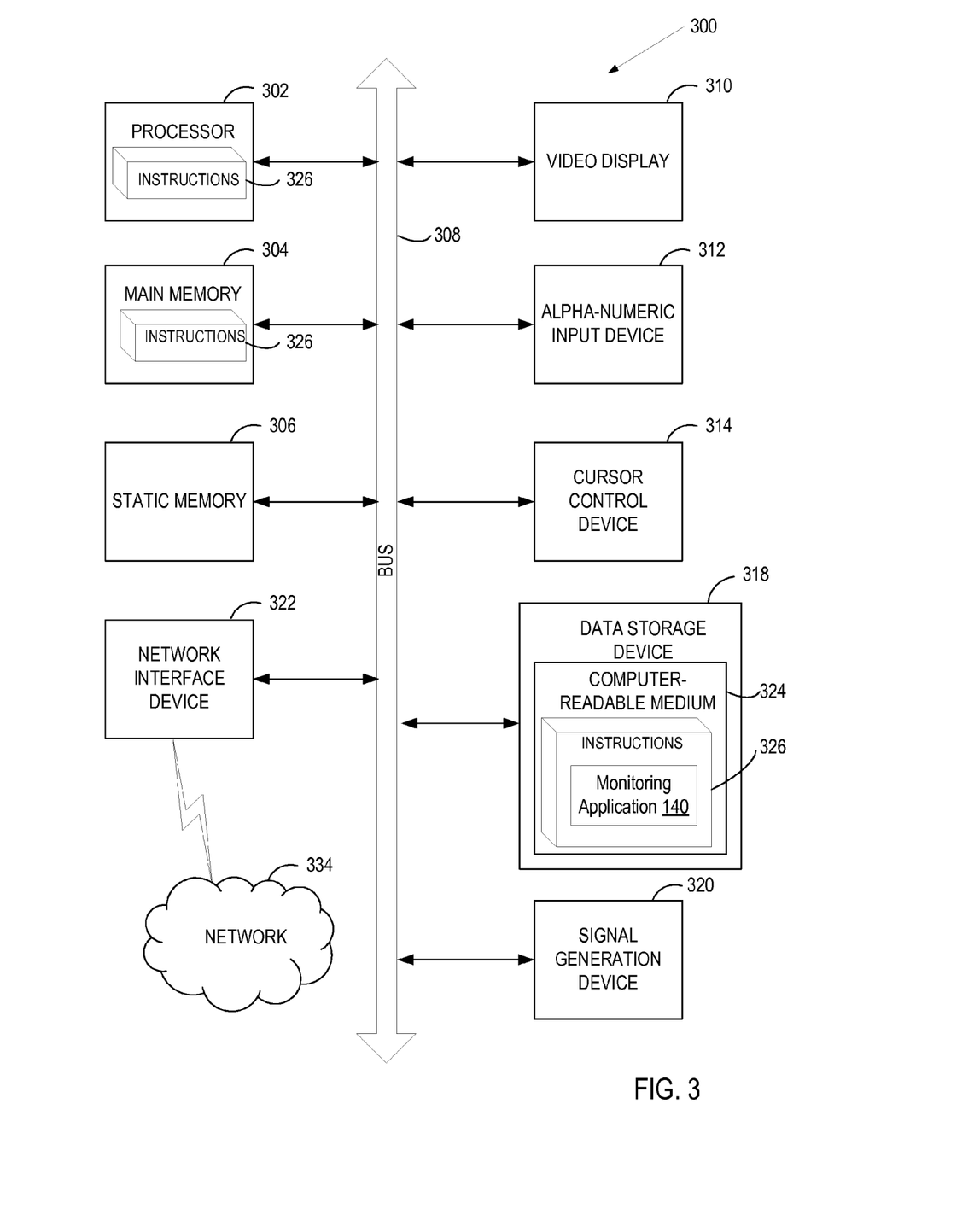
FIG. 3 is a block diagram of an exemplary computer system that may perform one or more of the operations described herein.

FIG. 3 illustrates a diagrammatic representation of a machine in the exemplary form of a computer system 300 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processing device (processor) 302, a main memory 304 (e.g., read-only memory (ROM), flash memory, dynamic random access memory (DRAM) such as synchronous DRAM (SDRAM) or Rambus DRAM (RDRAM), etc.), a static memory 306 (e.g., flash memory, static random access memory (SRAM), etc.), and a data storage device 318, which communicate with each other via a bus 308.

Processor 302 represents one or more general-purpose processing devices such as a microprocessor, central processing unit, or the like. More particularly, the processor 302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 302 may also be one or more special-purpose processing devices such as an application specific integrated circuit (ASIC), a field programmable gate array (FPGA), a digital signal processor (DSP), network processor, or the like. The processor 302 is configured to execute instructions 326 for performing the operations and steps discussed herein.

The computer system 300 may further include a network interface device 322. The computer system 300 also may include a video display unit 310 (e.g., a liquid crystal display (LCD) or a cathode ray tube (CRT)), an alphanumeric input device 312 (e.g., a keyboard), a cursor control device 314 (e.g., a mouse), and a signal generation device 320 (e.g., a speaker).

The data storage device 318 may include a computer-readable storage medium 324 on which is stored one or more sets of instructions 326 (e.g., software) embodying any one or more of the methodologies or functions described herein. The instructions 326 may also reside, completely or at least partially, within the main memory 304 and/or within the processor 302 during execution thereof by the computer system 300, the main memory 304 and the processor 302 also constituting computer-readable storage media. The instructions 326 may further be transmitted or received over a network 334 via the network interface device 322.

In one embodiment, the instructions 326 include instructions for a monitoring application 140 of FIG. 1B, and or a software library containing methods that call the monitoring application 140. While the computer-readable storage medium 324 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

I claim:

1. A method of safeguarding sensitive information comprising:
    detecting, by a monitoring application of a computing device, a policy violation on the computing device, wherein the policy violation comprises a user attempt to perform an operation to move data comprising the sensitive information off of the computing device;
    determining whether one or more previous policy violations have occurred on the computing device, wherein the one or more previous policy violations comprise other attempts of the user to perform an operation to move the data comprising the sensitive information off of the computing device; and
    performing an action to minimize a risk of data loss based on the one or more previous policy violations and a sequential order that the one or more previous policy violations occurred, wherein the performing the action further comprises:

performing a first action to minimize the risk of the data loss in response to determining that no previous policy violations occurred on the computing device; and performing a second action to minimize the risk of the data loss in response determining that the one or more previous policy violations occurred on the computing device, wherein the second action depends on a number, a severity, and the sequential order of the one or more previous policy violations.

2. The method of claim 1, further comprising:
storing the policy violation in a policy violation record, wherein the one or more previous policy violations are stored in the policy violation record.

3. The method of claim 2, further comprising:
removing any of the policy violation or the one or more previous policy violations that exceed an age threshold from the policy violation record.

4. The method of claim 1, wherein performing the action comprises comparing the policy violation and the one or more previous policy violations to a plurality of policy violation responses and performing the action in one of the plurality of policy violation responses that corresponds to the policy violation and the one or more previous policy violations.

5. The method of claim 1, wherein detecting the policy violation comprises:
detecting the user attempt to perform the operation;
scanning the data to determine that the data comprises the sensitive information; and
determining that the user is not authorized to perform the operation.

6. The method of claim 1, wherein the action depends on a data loss vector through which the user attempted to move the data off the computing device.

7. The method of claim 1, further comprising:
enabling an additional policy based on at least one of the policy violation or the one or more previous policy violations.

8. A computing apparatus comprising:
a memory;
a processing device communicably coupled to the memory;
a policy violation detector executed from the memory by the processing device, the policy violation detector configured to detect a policy violation on the computing apparatus, wherein the policy violation comprises a user attempt to perform an operation to move data comprising sensitive information off of the computing apparatus; and
a policy violation responder executed from the memory by the processing device, the policy violation responder configured to:
determine whether one or more previous policy violations have occurred on the computing device, wherein the one or more previous policy violations comprise other attempts of the user to perform an operation to move the data comprising the sensitive information off of the computing device; and
perform an action to minimize a risk of data loss based on the one or more previous policy violations and a sequential order that the one or more previous policy violations occurred, wherein performing the action further comprises the policy violation responder to:
perform a first action to minimize the risk of the data loss in response to determining that no previous policy violations occurred on the computing device; and perform a second action to minimize the risk of the data loss in response determining that the one or more previous policy violations occurred on the computing device, wherein the second action depends on a number, a severity, and the sequential order of the one or more previous policy violations.

9. The computing apparatus of claim 8, further comprising:
a policy violation record that stores the one or more previous policy violations;
and a policy violation recorder to store the policy violation in the policy violation record.

10. The computing apparatus of claim 9, further comprising:
the policy violation recorder to remove any of the policy violation or the one or more previous policy violations that exceed an age threshold from the policy violation record.

11. The computing apparatus of claim 8, wherein the policy violation responder to perform the action based on comparing the policy violation and the one or more previous policy violations to a plurality of policy violation responses and performing the action in one of the plurality of policy violation responses that corresponds to the policy violation and the one or more previous policy violations.

12. The computing apparatus of claim 8, wherein the policy violation detector to detect the policy violation based on detecting the user attempt to perform the operation, scanning the data to determine that the data comprises sensitive information, and determining that the user is not authorized to perform the operation.

13. The computing apparatus of claim 8, wherein the action depends on a data loss vector through which the user attempted to move the sensitive data off the computing device.

14. The computing apparatus of claim 8, further comprising:
the policy violation responder to enable an additional policy based on at least one of the policy violation or the one or more previous policy violations.

15. A non-transitory computer readable medium including instructions that, when executed by a processing system, cause the processing system to perform a method of safeguarding sensitive information, comprising:
detecting, by a monitoring application of a computing device comprising the processing system, a policy violation on the computing device, wherein the policy violation comprises a user attempt to perform an operation to move data comprising the sensitive information off of the computing device;
determining whether one or more previous policy violations have occurred on the computing device, wherein the one or more previous policy violations comprise other attempts of the user to perform an operation to move the data comprising the sensitive information off of the computing device; and
performing an action to minimize a risk of data loss based on the one or more previous policy violations and a sequential order that the one or more previous policy violations occurred, wherein the performing the action further comprises:
performing a first action to minimize the risk of the data loss in response to determining that no previous policy violations occurred on the computing device; and
performing a second action to minimize the risk of the data loss in response determining that the one or more previous policy violations occurred on the computing device, wherein the second action depends on a number, a severity, and the sequential order of the one or more previous policy violations.

16. The non-transitory computer readable medium of claim 15, the method further comprising:
storing the policy violation in a policy violation record, wherein the one or more previous policy violations are stored in the policy violation record.

17. The non-transitory computer readable medium of claim 16, the method further comprising:
removing any of the policy violation or the one or more previous policy violations that exceed an age threshold from the policy violation record.

18. The non-transitory computer readable medium of claim 15, wherein performing the action comprises comparing the policy violation and the one or more previous policy violations to a plurality of policy violation responses and performing the action in one of the plurality of policy violation responses that corresponds to the policy violation and the one or more previous policy violations.

19. The non-transitory computer readable medium of claim 15, wherein detecting the policy violation comprises:
detecting the user attempt to perform the operation;
scanning the data to determine that the data comprises sensitive information; and
determining that the user is not authorized to perform the operation.

20. The non-transitory computer readable medium of claim 15, wherein the action depends on a data loss vector through which the user attempted to move the sensitive data off the computing device.

21. The non-transitory computer readable medium of claim 15, the method further comprising:
enabling an additional policy based on at least one of the policy violation or the one or more previous policy violations.

* * * * *